US012757226B2

(12) United States Patent
Kalbasi

(10) Patent No.: US 12,757,226 B2
(45) Date of Patent: Oct. 6, 2026

(54) METHOD AND APPARATUS FOR SIDELINK RESOURCE ALLOCATION

(71) Applicant: Parsa Wireless Communications LLC, Stamford, CT (US)

(72) Inventor: Reza Kalbasi, San Diego, CA (US)

( * ) Notice: Subject to any disclaimer, the term of this patent is extended or adjusted under 35 U.S.C. 154(b) by 297 days.

(21) Appl. No.: 18/595,746

(22) Filed: Mar. 5, 2024

(65) Prior Publication Data

US 2025/0287400 A1 Sep. 11, 2025

(51) Int. Cl.

| | |
|---|---|
| ***H04W 72/25*** | (2023.01) |
| ***H04W 52/02*** | (2009.01) |
| ***H04W 72/0446*** | (2023.01) |
| ***H04W 72/0453*** | (2023.01) |
| ***H04W 76/28*** | (2018.01) |

(52) U.S. Cl.

CPC ....... *H04W 72/25* (2023.01); *H04W 52/0235* (2013.01); *H04W 72/0446* (2013.01); *H04W 72/0453* (2013.01); *H04W 76/28* (2018.02)

(58) Field of Classification Search

CPC ............. H04W 72/25; H04W 52/0235; H04W 72/0446; H04W 72/0453; H04W 76/28; H04W 76/36; H04W 72/02; H04W 92/18

See application file for complete search history.

(56) References Cited

U.S. PATENT DOCUMENTS

| | | | | |
|---|---|---|---|---|
| 6,771,670 | B1 | 8/2004 | Pfahler | |
| 12,075,391 | B2 * | 8/2024 | Fouad | H04W 52/0229 |
| 2010/0266063 | A1 | 10/2010 | Harel | |
| 2017/0303157 | A1 | 10/2017 | Siomina | |
| 2019/0182632 | A1 | 6/2019 | Fujishiro | |
| 2019/0386771 | A1 | 12/2019 | Liu | |
| 2020/0077458 | A1 | 3/2020 | Stauffer | |
| 2020/0091978 | A1 | 3/2020 | Noh | |
| 2020/0350969 | A1 | 11/2020 | Shimezawa | |

(Continued)

FOREIGN PATENT DOCUMENTS

| | | | |
|---|---|---|---|
| CN | 111294789 | A | 6/2020 |
| EP | 2389034 | B1 | 3/2011 |

(Continued)

OTHER PUBLICATIONS

GPP TSG RAN Meeting #88-e; RP-201038; Revised Work Item on NR Multicast and Broadcast Services (2013); Huwai; Jun. 29, 2020.

(Continued)

*Primary Examiner* — Abdullahi Ahmed

(74) *Attorney, Agent, or Firm* — John F. Vodopia

(57) ABSTRACT

A method of data transmission performed by a first user equipment (UE) includes receiving, by the first UE, one or more configuration parameters indicating a first set of time and frequency resources associated with partial sensing in sidelink communications; monitoring for sidelink control information (SCI) based on the partial sensing and in one or more resources determined based on the one or more configuration parameters; receiving, based on the monitoring, the SCI from a second UE; and receiving, based on the SCI, sidelink data from the second UE. The first set of time and frequency resources can include one or more time slots in a same frequency subband, and the first set of time and frequency resources may include one or more time slots in one or more frequency subbands.

20 Claims, 19 Drawing Sheets

(56) References Cited

U.S. PATENT DOCUMENTS

| | | | | |
|---|---|---|---|---|
| 2020/0396591 | A1 | 12/2020 | Ou | |
| 2020/0413301 | A1 | 12/2020 | Shi | |
| 2021/0051505 | A1 | 2/2021 | Xu | |
| 2021/0099324 | A1 | 4/2021 | Choi | |
| 2021/0105055 | A1 | 4/2021 | Chae | |
| 2021/0259040 | A1 | 8/2021 | Babaei | |
| 2021/0274525 | A1 | 9/2021 | Wei | |
| 2021/0410180 | A1 | 12/2021 | Tsai | |
| 2022/0060923 | A1 | 2/2022 | Zheng | |
| 2022/0104126 | A1* | 3/2022 | Lee | H04W 52/0219 |
| 2022/0116942 | A1* | 4/2022 | Fouad | H04B 17/318 |
| 2022/0400469 | A1* | 12/2022 | Li | H04W 74/0808 |
| 2023/0337187 | A1* | 10/2023 | Ye | H04W 52/0216 |
| 2024/0243895 | A1* | 7/2024 | Rastegardoost | H04W 72/51 |
| 2024/0267891 | A1* | 8/2024 | Guo | H04W 72/11 |
| 2024/0349304 | A1* | 10/2024 | Guo | H04B 17/328 |
| 2026/0052514 | A1* | 2/2026 | Ye | H04W 72/02 |

FOREIGN PATENT DOCUMENTS

| | | | |
|---|---|---|---|
| EP | 3509343 | A1 | 1/2019 |
| WO | 2015169371 | A1 | 11/2015 |
| WO | 2016141514 | A1 | 9/2016 |
| WO | 2016196044 | A1 | 12/2016 |
| WO | 2017086843 | A1 | 5/2017 |
| WO | 2018142345 | A1 | 8/2018 |
| WO | 2020150952 | A1 | 7/2020 |
| WO | 2020167205 | A1 | 8/2020 |
| WO | 2020167747 | A1 | 8/2020 |
| WO | 2022180226 | A1 | 9/2020 |
| WO | 2020220233 | A1 | 11/2020 |
| WO | 2020247043 | A1 | 12/2020 |
| WO | 2021023280 | A1 | 2/2021 |
| WO | 2021033085 | A1 | 2/2021 |
| WO | 2021078357 | A1 | 4/2021 |
| WO | 2021098074 | A1 | 5/2021 |
| WO | 2021152405 | A1 | 8/2021 |
| WO | 2021163527 | A1 | 8/2021 |
| WO | 2021228406 | A1 | 11/2021 |
| WO | 2021242157 | A1 | 12/2021 |
| WO | 2022078804 | A1 | 4/2022 |
| WO | 2022082727 | A1 | 4/2022 |

OTHER PUBLICATIONS

3GPP TS 36.300; 3rd Generation Partnership Project; Technical Specification Group Radio Access Network; NR; Radio Resource Control (RRC) protocol specification (Release 16) (Jun. 2021).

3GPP TS 38.331;3rd Generation Partnership Project; Technical Specification Group Radio Access Network; NR; Medium Access Control (MAC) protocol specification (Release 16); (Dec. 2020).

3GPP TSG WG1 Meeting #103-E; Intel Corp., Sidelink Enhancements for UE Power Saving; R1-2008998; Oct. 26, 2020.

3GPP TSG RAN WG1 #106-e; Interdigital Inc.; Sidelink Resourse Allocation for Power Saving; R1-2108035; Aug. 16, 2021.

3GPP TSG RAN WG2 Meeting of #114-e; Report from email discussion [AT114-e][027][QoE] Start and Stop (Lenovo); May 19, 2021.

Scheffel, et al.; WSN Data Confidence Attribution Using Predictors; 2018 Eighth Latin American Symposium on Dependable Computing (LADC); 2018.

3GPP_TS_28_404; 3rd Generation Partnership Project; Technical Solution Group Services and System Aspects; Mar. 27, 2020.

3GPP TSG RAN WG2 Meeting # 114-e; Further Discussion on QoE Measurement Collection in NR Standalone; R2_2105214; May 19, 2021.

3GPP TSG RAN WG2 Meeting # 114; Change Request; R2_2106554; May 19, 2021.

3GPP TSG-RAN WG3 #112-e; ZTE, China Telecom; TP for TS 38.300 Introduce NR QoE; May 17, 2021.

3GPP TR 38.890; 2021-04; Study on NR QoE Management and Optimizations for Diverse Services; Release 17; Apr. 9, 2021.

3GPP TSG RAN WG1 #105-e; Feature Lead Summary # 5 on RAN basic functions for broadcast/multicast for UEs in RRC_IDLE/ RRC_Inactive States; May 10, 2021.

3GPP YSG-RAN WG2 Meeting #112-e; Qualcomm;NR Multicast-Broadcast Services and Configuration for UEs in Different RRC States; R2_2009038; Nov. 2, 2020.

3GPP YSG-RAN WG2 Meeting #111 Electronic; Scope and Architecture Analysis of NR MBS; R2_2007442; Aug. 17, 2020.

3GPP TSG-RAN WG2 Meeting #113e; Futurewei; Discussion on Nr Mbs Solutions of Mode 2 Delivery; R2-2100631; Jan. 25, 2021.

3GPP TSG-RAN WG2 Meeting #114-e; MBA Mac Layer and Group Scheduling Aspects; R2-2104876; May 19, 2021.

3GPP TSG-RAN WG2 Meeting #113bis electronic; Discussion on QoE Measurement Pausing and Resuming; R2-2103146; Apr. 2021.

3GPP TSG RAN WG1 #102-e Meeting; On Basic Functions for Broadcast/Multicast for RRC_Idle/RRC_Inactive UEs; R1-2006175; Aug. 17, 2020.

3GPP TR 23.757; Study on Architectural Enhancements for 5G Multicast-Broadcast Services (Release 17); Mar. 2021.

3GPP FSG-RAN WG2 Meeting #111 electronic; Overview of NR MBS; R2-20070033; Aug. 18, 2020.

3GPP TSG-RAN WG2 Meeting #113-bis-e; ZTE Corp .; Discussion on Pause/Resume NR QoE Reporting; R2-2104271; Apr. 12, 2021.

3GPP TSG-RAN WG2 Meeting 113bis-e; Multicast Session Reception in Rrc Inactive; R2-2103907; Apr. 12, 2021.

3GPP TSG RAN WG1 #105-e; Intel Corp.; NR MBS Group Scheduling for RRC_Connected UEs; R1-2104928; May 19, 2021.

3GPP TSG-RAN WG2 Meeting #113bis Electronic; QoE Reporting Control by RAN Awareness on QoE Parameter; R2-2103556; Apr. 12, 2021.

3GPP TSG-RAN WG2 Meeting #112-e; ZTE; Discussion on QoE in NR; R2-2010476; Nov. 2, 2020.

3GPP TSG-RAN WG2 Meeting #112-e; Nokia; Analysis of Solutions for Paging Collision; R2-2009264; Nov. 2, 2020.

3GPP TSG RAN WG2 #113bis; Ericsson; Configuration and Reporting for QoE Management; R2-2103049; Apr. 12, 2021.

3GPP TSG-RAN WG2 Meeting #97; Change Request; R2-1702256; Feb. 13, 2017.

3GPP TSG RAN WG1 Meeting #92bis; Apple; Discussion on Beam Measurement and Reporting; R1-1804770; Apr. 16, 2018.

3GPP TSG-RAN #111-e Qualcomm summary of off line discussion Jan. 25-Feb. 4, 2021.

Notification of transmittal of the ISR and the WO of the ISA mailed Sep. 20, 2022 in PCT/US2022/032419.

R3_212440 3GPP TSG-RAN WG3 #112-e May 17-28, 2021 ZTE.

R2-2103146 3GPP TSG-RAN WG2 Meeting #113bis electronic Apr. 2012 OPPO; Discussion on QoE Measurement Pausing and resuming.

R2-210271 3gPP TSG RAN WG2 Meeting #113-bis-e Apr. 12-Apr. 20, 2021 ZTE NR QoE Reporting.

R2-2103556 3GPP TSG-RAN WG2 Meeting #113bis electronic NOKIA QoE Reporting Control by RAN Awareness.

Search eport P0043PCT.

Lenovo Further_Discussion On Que Measurement R2-2105214.

3rd Gen Partnership Project TS 28.404 Technical spec group services and system aspects.

Lenovo Report from email discussion May 2021 R2-2106661.

Interdigital Sidelink_Resource allocation Aug. 6, 2021.

Intel Sidelink enhancements for UE power savings Oct. 24, 2020.

Notification of Transmittal ISR and Written opinion of ISA.

* cited by examiner

| Logical channel \ Transport channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Logical channel \ Transport channel | UL-SCH | RACH |
|---|---|---|
| CCCH | X | |
| DCCH | X | |
| DTCH | X | |

FIG. 3B

| Logical channel \ Transport channel | SL-BCH | SL-SCH |
|---|---|---|
| SBCCH | X | |
| SCCH | | X |
| STCH | | X |

FIG. 3C

| Transport channel \ Physical channel | PDSCH | PDCCH | PBCH |
| --- | --- | --- | --- |
| BCH | | | X |
| PCH | X | | |
| DL-SCH | X | | |

FIG. 4A

| Transport channel \ Physical channel | PUSCH | PUCCH | PRACH |
| --- | --- | --- | --- |
| UL-SCH | X | | |
| RACH | | | X |

FIG. 4B

| Transport channel \ Physical channel | PSSCH | PSCCH | PSFCH | PSBCH |
| --- | --- | --- | --- | --- |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

METHOD AND APPARATUS FOR SIDELINK RESOURCE ALLOCATION

CROSS-REFERENCE TO RELATED APPLICATIONS

This application is a national stage application of PCT/US2022/38361, filed Jul. 26, 2022 (the PCT application"), now filed in the United States under 35 USC § 371. The PCT application claims priority under 35 USC § 119(e) from U.S. Provisional Patent Application No. 63/242,132, filed on Sep. 9, 2021 ("the provisional application"); the contents content of each of the PCT application and the provisional patent application is incorporated herein by reference.

BACKGROUND OF THE INVENTION

The present invention is directed to 5G, which is the 5$^{th}$ generation mobile network. It is a new global wireless standard after 1G, 2G, 3G, and 4G networks. 5G enables networks designed to connect machines, objects and devices.

The invention is more specifically directed to method of data transmission in reliance upon one or more configuration parameters indicating a first set of time and frequency resources associated with partial sensing in sidelink communications.

SUMMARY OF THE INVENTION

In an embodiment, the invention provides a method of data transmission performed by a first user equipment (UE), including receiving, by the first UE, one or more configuration parameters indicating a first set of time and frequency resources associated with partial sensing in sidelink communications; monitoring for sidelink control information (SCI) based on the partial sensing and in one or more resources determined based on the one or more configuration parameters; receiving, based on the monitoring, the SCI from a second UE; and receiving, based on the SCI, sidelink data from the second UE. The first set of time and frequency resources can include one or more time slots in a same frequency subband, and the first set of time and frequency resources may include one or more time slots in one or more frequency subbands.

The one or more configuration parameters can be transmitted via a dedicated channel defined for the transmission of the first set of time and frequency resources. The one or more configuration parameters are transmitted semi-statically via a Physical Sidelink Broadcast Channel (PSBCH). The receiving the sidelink data may be based on a second set of time and frequency resources; and the second set of time and frequency resources may be selected based on sensing the first set of time and frequency resources such that no collision occurs in the second set of time and frequency resources. The method may include performing a pre-emption check before receiving traffic in the second set of time and frequency resources to determine if any other traffic collides with the resources in said second set. The sidelink data can be a periodic traffic. The sidelink data can be an aperiodic traffic. A base station (BS) may configure the resources in the first set of time and frequency resources.

In the method, the first user equipment (UE) can be configured with discontinuous reception (DRX). The first set of time and frequency resources can be within the DRX on duration. For that matter, the first user equipment (UE) may be configured with a wake up signal (WUS), wherein the WUS signal can notify to the first UE to wake up and monitor for sidelink control information (SCI) in the first set of time and frequency resources.

In an embodiment, the invention provides a user equipment (UE) with one or more processors; and memory storing instructions, that when executed by the one or more processors, cause the UE to: receive one or more configuration parameters indicating a first set of time and frequency resources associated with partial sensing in sidelink communications, monitor for sidelink control information (SCI) based on the partial sensing and in one or more resources determined based on the one or more configuration parameters, receive, based on the monitoring, the SCI from a second UE and receive, based on the SCI, sidelink data from the second UE. Preferably, the first set of time and frequency resources includes one or more time slots in a same frequency subband. The first set of time and frequency resources can include one or more time slots in one or more frequency subbands. The one or more configuration parameters can be transmitted via a dedicated channel defined for the transmission of the first set of time and frequency resources. The one or more configuration parameters can be transmitted semi-statically via a Physical Sidelink Broadcast Channel (PSBCH).

In the user equipment (UE), receiving the sidelink data can be based on a second set of time and frequency resources and the second set of time and frequency resources can be selected based on sensing the first set of time and frequency resources such that no collision occurs in the second set of time and frequency resources. The instructions, when executed by the one or more processors, may further cause the UE to: perform a pre-emption check before receiving traffic in the second set of time and frequency resources to determine if any other traffic collides with the resources in said second set. The sidelink data may be a periodic or aperiodic traffic. For that matter, a base station (BS) may configure the resources in the first set of time and frequency resources. And the first user equipment (UE) may be configured with discontinuous reception (DRX). And the first set of time and frequency resources preferably are within the DRX on duration. The first user equipment (UE) may configured with a wake up signal (WUS), wherein the WUS signal notifies to the first UE to wake up and monitor for sidelink control information (SCI) in the first set of time and frequency resources.

In an embodiment, the invention provides a method of data transmission, performed by a base station. The method includes transmitting, by the base station to a first user equipment (UE), one or more configuration parameters indicating a first set of time and frequency resources associated with partial sensing in sidelink communications; wherein: sidelink control information (SCI) is monitored based on the partial sensing and in one or more resources determined based on the one or more configuration parameters, the SCI is received from a second UE based on the monitoring and sidelink data is received from the second UE based on the SCI. The first set of time and frequency resources can include one or more time slots in a same frequency subband. The first set of time and frequency resources can include one or more time slots in one or more frequency subbands. The method can also include transmitting the one or more configuration parameters via a dedicated channel defined for the transmission of the first set of time and frequency resources.

The one or more configuration parameters may be transmitted semi-statically via a Physical Sidelink Broadcast Channel (PSBCH). Receiving the sidelink data can be based on a second set of time and frequency resources; and thee second set of time and frequency resources can be selected based on sensing the first set of time and frequency resources such that no collision occurs in the second set of time and frequency resources. A pre-emption check can be performed before receiving traffic in the second set of time and frequency resources to determine if any other traffic collides with the resources in said second set. The sidelink data may be periodic traffic or aperiodic traffic. The method can further comprise configuring, by the base station, the resources in the first set of time and frequency resources. The method can further comprise configuring the first user equipment (UE) with discontinuous reception (DRX). The first set of time and frequency resources can be within the DRX on duration. The first user equipment (UE) can be configured with a wake up signal (WUS), wherein the WUS signal notifies to the first UE to wake up and monitor for sidelink control information (SCI) in the first set of time and frequency resources.

In an embodiment, the invention provides a base station with one or more processors; and memory storing instructions, that when executed by the one or more processors, cause the base station to: transmit, to a first user equipment (UE), one or more configuration parameters indicating a first set of time and frequency resources associated with partial sensing in sidelink communications; and wherein sidelink control information (SCI) is monitored based on the partial sensing and in one or more resources determined based on the one or more configuration parameters, the SCI is received from a second UE based on the monitoring and sidelink data is received from the second UE based on the SCI. The first set of time and frequency resources can include one or more time slots in a same frequency subband. The first set of time and frequency resources can include one or more time slots in one or more frequency subbands.

Instructions, when executed by the one or more processors, may further cause the base station to transmit the one or more configuration parameters via a dedicated channel defined for the transmission of the first set of time and frequency resources. The one or more configuration parameters may be transmitted semi-statically via a Physical Sidelink Broadcast Channel (PSBCH). Receiving the sidelink data may be based on a second set of time and frequency resources; and the second set of time and frequency resources may be selected based on sensing the first set of time and frequency resources such that no collision occurs in the second set of time and frequency resources. A pre-emption check can be performed before receiving traffic in the second set of time and frequency resources to determine if any other traffic collides with the resources in said second set. The sidelink data may be a periodic traffic or an aperiodic traffic.

The instructions, when executed by the one or more processors, can further cause the base station to configure the resources in the first set of time and frequency resources. The instructions, when executed by the one or more processors, may further cause the UE to configure the first user equipment (UE) with discontinuous reception (DRX). The first set of time and frequency resources can be within the DRX on duration. The first user equipment (UE) can be configured with a wake up signal (WUS), wherein the WUS signal notifies to the first UE to wake up and monitor for sidelink control information (SCI) in the first set of time and frequency resources.

In an embodiment, the invention provides a system with a base station; and a user equipment (UE), where the UE has one or more processors and memory storing instructions, that when executed by the one or more processors, cause the UE to: receive, from the base station, one or more configuration parameters indicating a first set of time and frequency resources associated with partial sensing in sidelink communications; monitor for sidelink control information (SCI) based on the partial sensing and in one or more resources determined based on the one or more configuration parameters; receive, based on the monitoring, the SCI from a second UE; receive, based on the SCI, sidelink data from the second UE.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
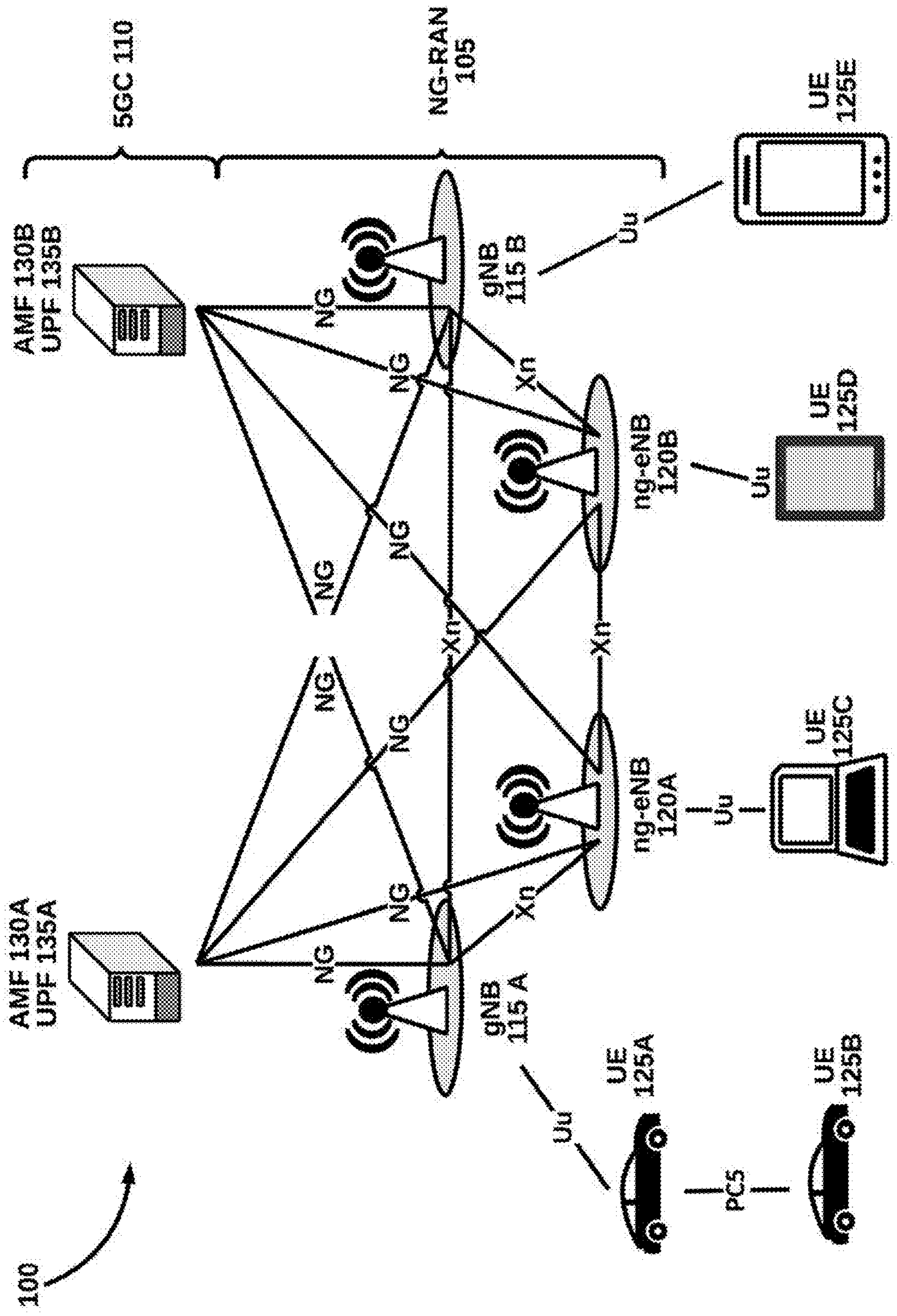
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5g-CN) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5G-CN 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different name for the RAN nodes may be used, for example depending on the RAT used for the RAN. A RAN node may be referred to as Node B (NB) in a RAN that used the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
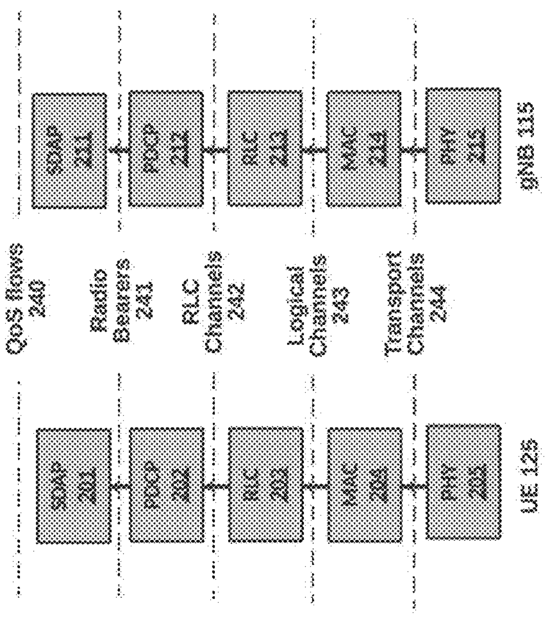
FIG. 2A and FIG. 2B show examples of radio protocol stacks for user plane and control plane, respectively, according to some aspects of some of various exemplary embodiments of the present disclosure.
Figure 2B:
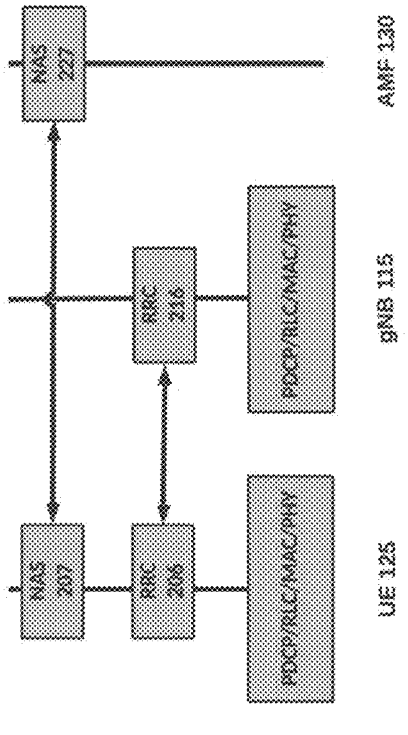

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
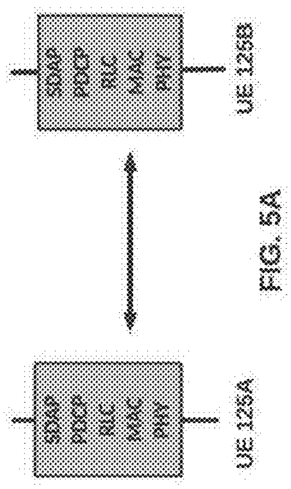
FIG. 5A, FIG. 5B, FIG. 5C and FIG. 5D show examples of radio protocol stacks for NR sidelink communication according to some aspects of some of various exemplary embodiments of the present disclosure.
Figure 5B:
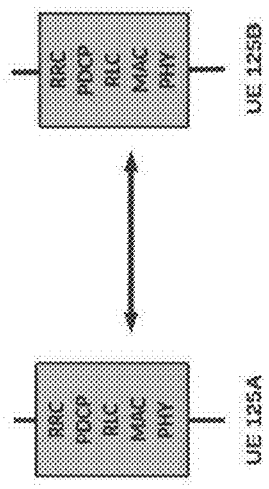
Figure 5C:
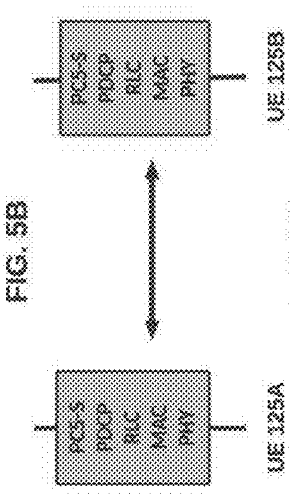
Figure 5D:
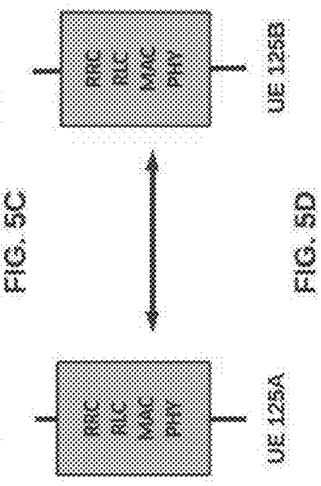

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
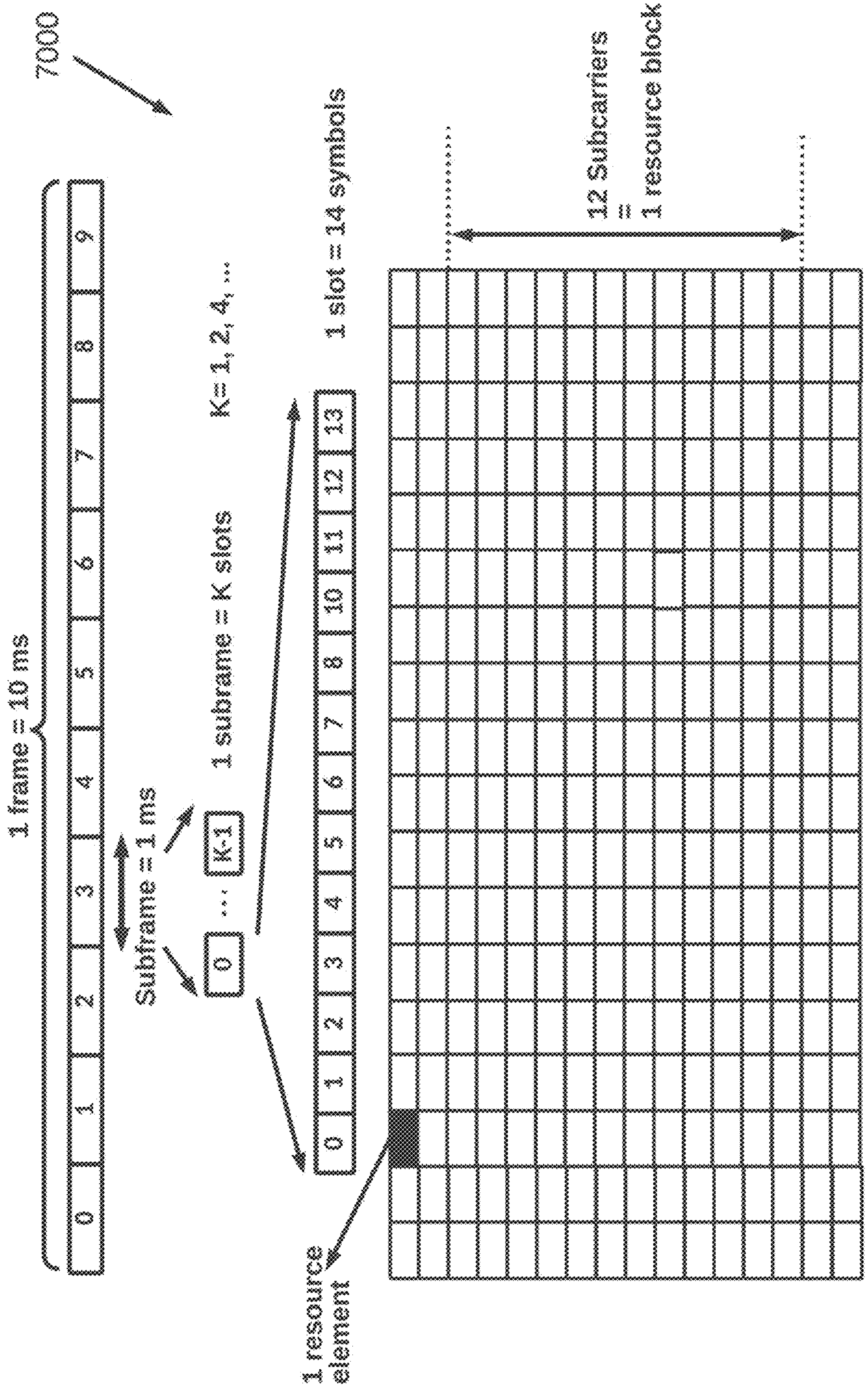
FIG. 7 shows examples of Radio Resource Control (RRC) states and transitioning between different RRC states according to some aspects of some of various exemplary embodiments of the present disclosure.

FIG. 7 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 7 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 8:
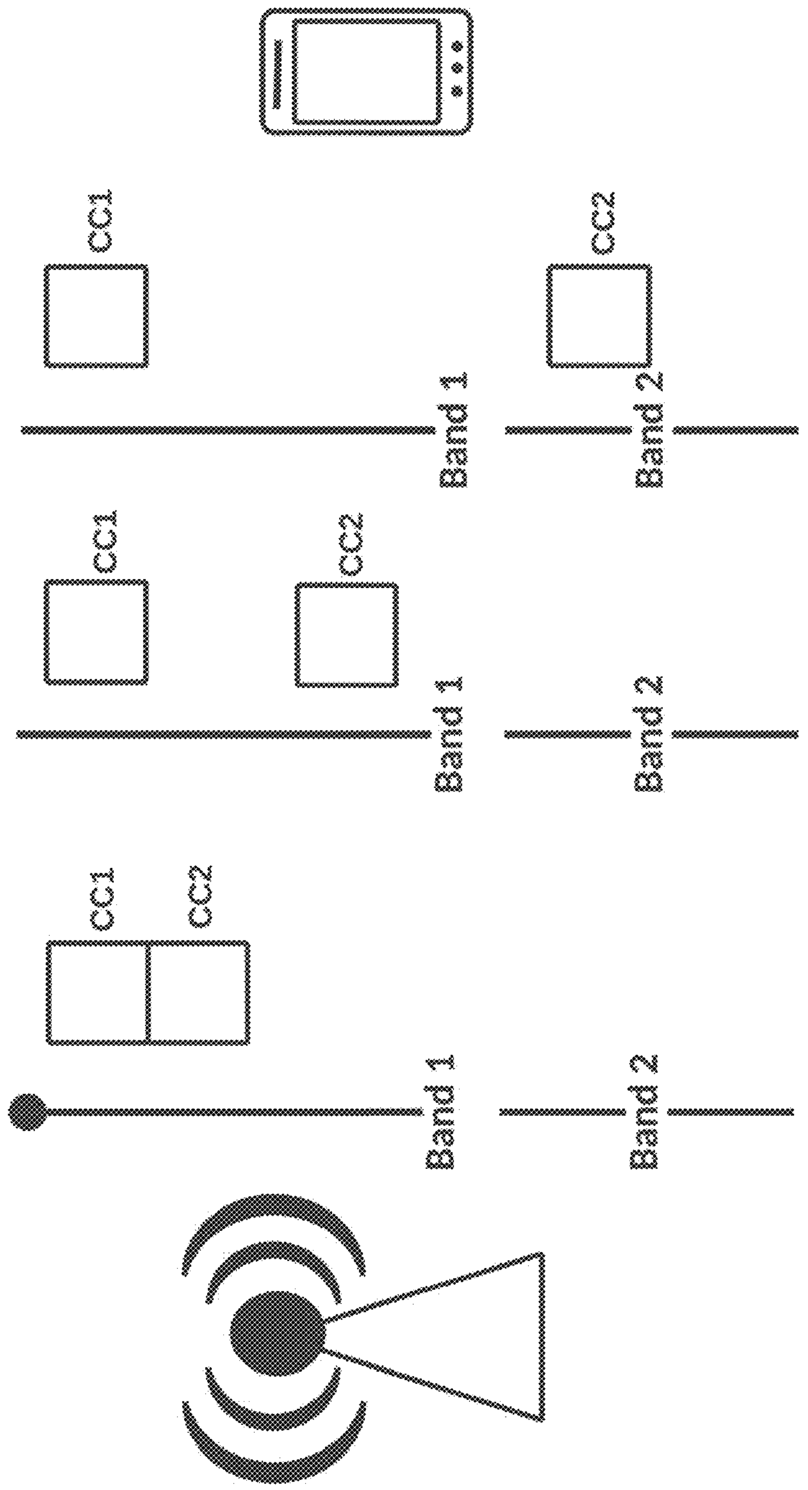
FIG. 8 shows example frame structure and physical resources according to some aspects of some of various exemplary embodiments of the present disclosure.

FIG. 8 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 8. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 9:
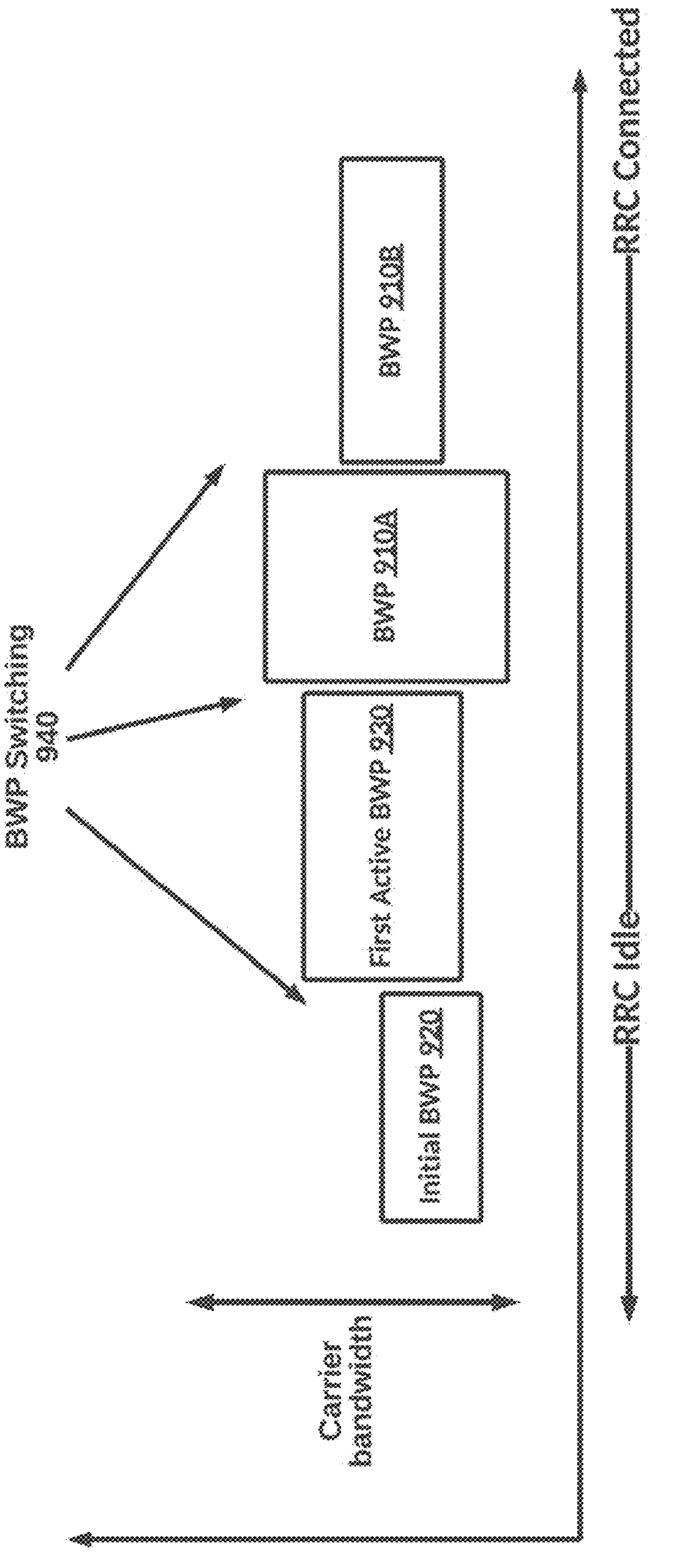
FIG. 9 shows example component carrier configurations in different carrier aggregation scenarios according to some aspects of some of various exemplary embodiments of the present disclosure.

FIG. 9 shows example bandwidth part configuration and switching according to some aspects of some of various exemplary embodiments of the present disclosure. The UE may be configured with one or more Bandwidth Parts (BWPs) 910 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 920 determined from system information may be used. With Bandwidth Adaptation (BA), for example through BWP switching 940, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 920 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 10:
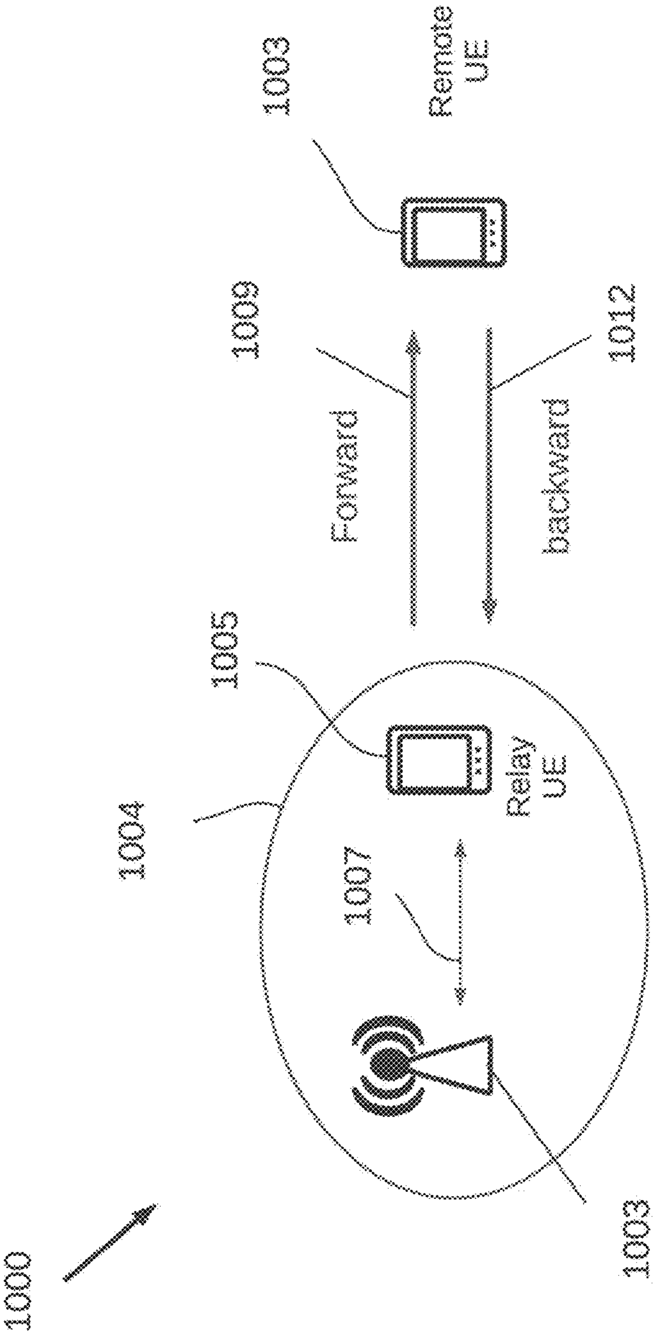
FIG. 10 shows example of a Sidelink (SL) communication system according to some aspects of some of various exemplary embodiments of the present disclosure.

FIG. 10 shows example of sidelink communication scheme 1000 for forward/backward link operation according to some aspects of the present disclosure. The scheme 1000 may be employed by UEs 125A-B in a network such as networks 100 for sidelink communications. In particular, sidelink UEs may employ scheme 1000 for Sidelink Control Information (SCI) and sidelink data over the sidelink links. For example, the relay UE 1005 may transmit SCI/sidelink data over the forward link 1009 to the remote UE 1003, and the remote UE 1003 may transmit SCI/sidelink data over the backward link 1012 to the relay UE 1005. In the scheme 1000, a relay UE 1005 within the coverage area 1004 of the BS 1003 and in communication with the BS 1003 over the link 1007, may operate as a relay for the remote UE 1003. For instance, the UE 1005 may relay DL SCI/Data from the BS 1003 to the UE 1003 over the forward link 1009, and/or UL SCI/Data from the UE 1003 to the BS 1003 over the backward link 1012. The BS 1004 may be similar to the gNB 11A-B. The relay UE 1005 may be similar to the relay UE 125A, and the remote UE 125 B may be similar to the remote UE 125B. In some examples, the relay UE 1005 may operate as a relay for a group of remote UEs 1003.

Figure 11:
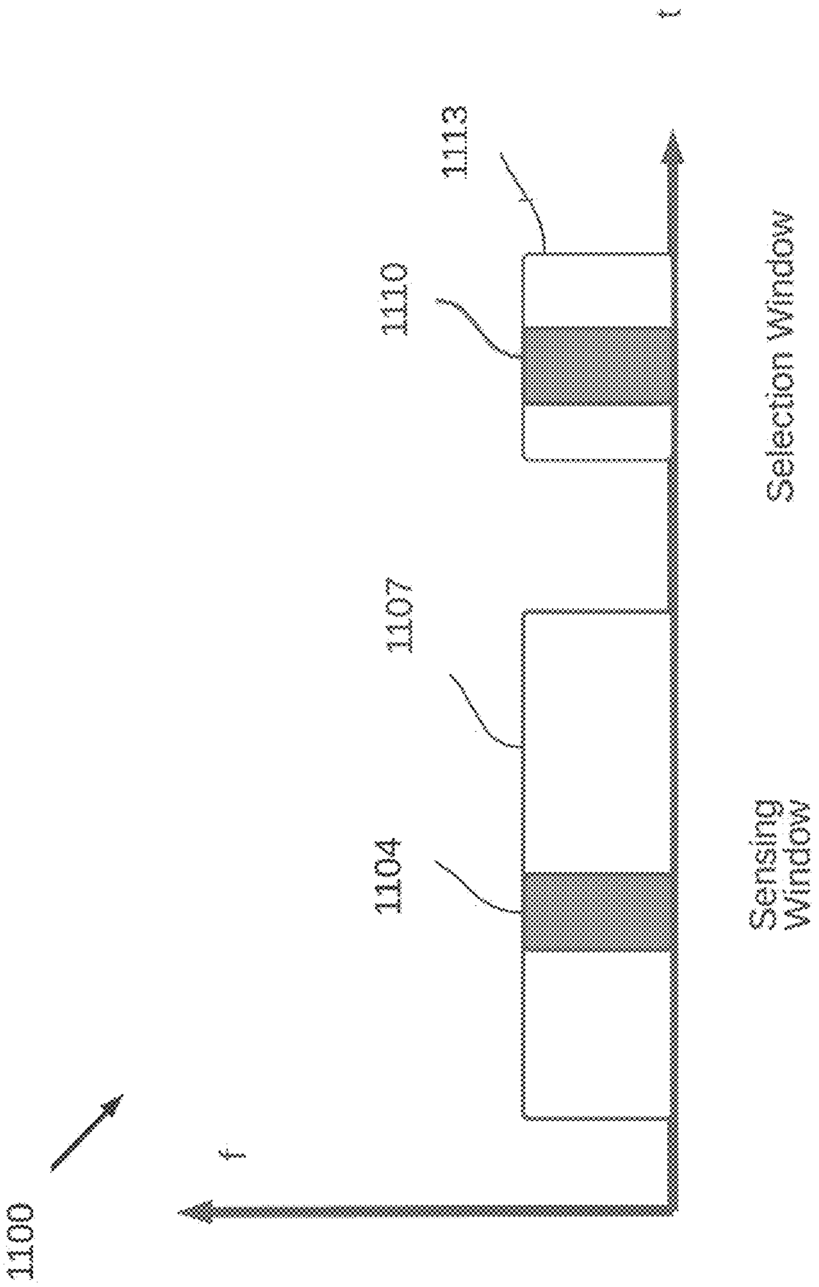
FIG. 11 shows example of SL resource allocation process according to some aspects of some of various exemplary embodiments of the present disclosure.

In the scheme 1000, the relay UE 1005 may communicate with the remote UE 1003 using a resource pool. In some examples, the resource pool may be pre-configured by the BS 1004 or the relay UE 1005, and may be indicated to the remote UE 1003 via the relay UE 1005. In some examples, the remote UE 1003 may randomly select resources within the resource pool. In some variants, the UE 1005 may sense the entire resource pool to enable the entire resource pool for communication with the relay UE 1005. In some variants, the remote UE 1003, may partially sense the resource pool to enable the part of the resource pool for communication with the relay UE 1005. For example, the UE 1003 may measure the Received Signal Received Power (RSRP) in different RBs of the resource pool to enable partial or full resource selection, and avoid collision in the selected resource pool FIG. 11 shows example of sidelink resource pool selection according to some aspects of the present disclosure. The scheme 1100 may be employed by UEs 125A-B in a network such as networks 100 for sidelink communications. In particular, sidelink UEs may employ the scheme 1100 for SCI monitoring and sidelink data communication over the sidelink forward/backward links. In some aspects, the scheme 1100 can be employed in conjunction with the scheme 1000 of FIG. 10. In FIG. 1100, the x-axis represents time in some arbitrary units, and the y-axis represents frequency in some arbitrary units. The sidelink resource pool 1100 may be over a licensed band or a shared radio frequency band (e.g., in an unlicensed band). The resource pool 1100 may have the same frame structure 700 shown in FIG. 7. For instance, the resource pool 1100 may include a set of sidelink resource pool 1107, 1110, arranged in a number of slots across time and a number of subbands in frequency similar to the resource 700 shown in FIG. 7. Each sidelink resource 1100 may include a sensing windows 1107, and a selection window 1113. In some example, the BS (e.g. 1003) may configure the relay UE (e.g., 1005) with the sidelink resource pool. In some example, the relay UE (e.g., 1005) may determine the sidelink resource pool 1100 based on a configuration received from the BS (e.g., BS 1003). In some aspect, the resource pool 1100 may be used for transmission from the relay UE to the remote UE over the forwardlink 1009. In some aspects, the resource pool 1100 may be used for transmission from the remote UE to the relay UE over the backward link.

The remote UE may perform partial/full sensing within the sensing window 1107 to avoid collision before communication over the sidelink. In some example, the remote UE may monitor Y slots 1104 in the sensing window 1107 to enable partial sensing, and may reserve candidate resource 1100 which includes Y slots in the selection window 1113 for SCI/data transmission. The candidate resource set is reserved by the remote UE to avoid collisions with the other UEs. In some example, the remote UE may perform long-term partial sensing, where a resource selection for the UE can may be triggered at specific time (periodic traffic). In some examples, the remote UE may perform short-term sensing, where a resource selection for the UE may be triggered for aperiodic traffic.

In full sensing, the remote UE may need to monitor SCI in all of the slots in the sensing window 1107, and may need to decode SCI/PSSSH in all subchannels in the selection window 1107, which may not be desirable for power consumption for the battery limited remote UE. To reduce the amount SCI and/or PSSSH decoding, the remote UE may perform sensing. In partial sensing, the remote UE may select Y slots 1104 within the resource selection window 1107, and may perform sensing on Y slots. Then remote UE may determine, the candidate resource set 1110 within the selection window 1113 based on the results of sensing in each of slots 1104. In order to reduce SCI and/or PSSSH decoding, the partial sensing slots may be pre-configured by the BS and signaled to remote UE.

In some example, the BS may determine a subset of time and frequency resources within the Y slots 1104, and may configure the remote UE with the SCI monitoring search region. Hence, the remote UE may perform partial sensing in the subset of the time and frequency resources configured by the BS. In some example, the subset of time and frequency resources are transmitted to the remote UE via PSBCH semi-statically. In some other example, the subset of time and frequency resources are transmitted to the remote UE via SCI in PSCCH dynamically. In yet another example, the subset of time and frequency resources are transmitted to the remote UE via a separate channel dedicated for the transmission of the subset of time and frequency resources.

Figure 12:
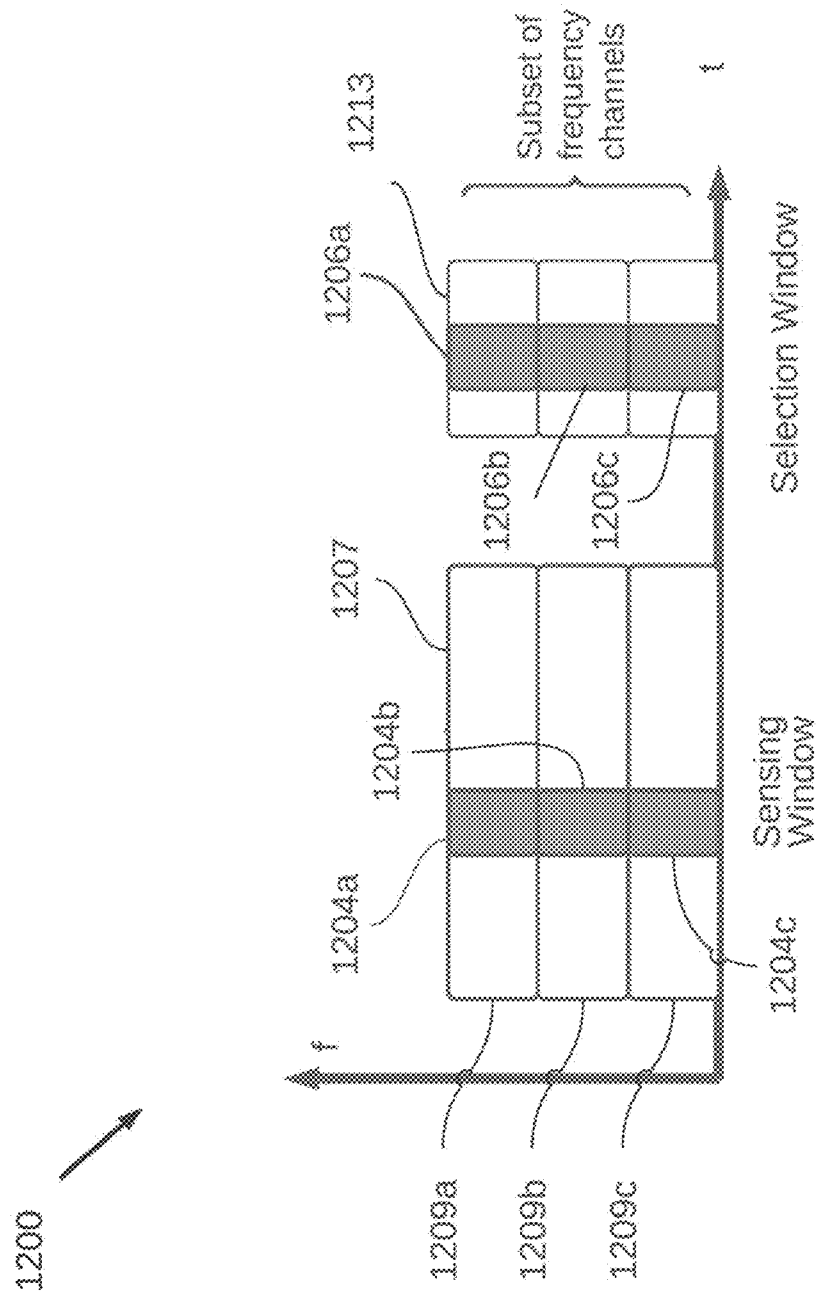
FIG. 12 shows example of SL resource allocation process in different frequency subbands according to some aspects of some of various exemplary embodiments of the present disclosure.

FIG. 12 shows example of sidelink resource pool selection according to some aspects of the present disclosure. The scheme 1200 may be employed by UEs 125A-B in a network such as networks 100 for sidelink communications. In particular, sidelink UEs may employ the scheme 1100 for SCI monitoring and sidelink data communication over the sidelink forward/backward links. In some aspects, the scheme 1200 can be employed in conjunction with the scheme 1000 of FIG. 10. In FIG. 1200, the x-axis represents time in some arbitrary units, and the y-axis represents frequency in some arbitrary units. The sidelink resource pool 1200 may be over a licensed band or a shared radio frequency band (e.g., in an unlicensed band). The resource pool 1200 may have the same frame structure 700 shown in FIG. 7. For instance, the resource pool 1200 may include a set of sidelink resource pool 1205, 1206, arranged in a number of slots across time and a number of subbands 1209*a-c* in frequency similar to the resource 700 shown in FIG. 7. Each sidelink resource 1200 may include a sensing windows 1207, and a selection window 1213. In some example, the BS (e.g. 1003) may configure the relay UE (e.g., 1005) with the sidelink resource pool. In some example, the relay UE (e.g., 1005) may determine the sidelink resource pool 1200 based on a configuration received from the BS (e.g., BS 1003). In some aspect, the resource pool 1200 may be used for transmission from the relay UE to the remote UE over the forwardlink 1009. In some aspects, the resource pool 1200 may be used for transmission from the remote UE to the relay UE over the backward link.

The remote UE may perform partial/full sensing within the sensing window 1207 to avoid collision before communication over the sidelink. In some example, the remote UE may monitor Y slots 1204*a*, 1204*b*, 1204*c* in subband 1209*a*, 1209*b*, 1209*c* respectively. The remote UE may perform partial sensing in sensing window 1207 to enable partial sensing, and may reserve candidate resources 1206*a*, 1206*b*, 1206*c* in subbands 1209*a*, 1209*b*, 1209*c* which each includes Y slots in the selection window 1213 for SCI/data transmission. The candidate resource set is reserved by the remote UE to avoid collisions with the other UEs. In some example, the remote UE may perform long-term partial sensing, where a resource selection for the UE can may be triggered at specific time (periodic traffic). In some examples, the remote UE may perform short-term sensing, where a resource selection for the UE may be triggered for aperiodic traffic.

In full sensing, the remote UE may need to monitor SCI in all of the slots in the sensing window 1207, and may need to decode SCI/PSSSH in all subchannels in the selection window 1207, which may not be desirable for power consumption for the battery limited remote UE. To reduce the amount SCI and/or PSSSH decoding, the remote UE may perform sensing. In partial sensing, the remote UE may select Y slots 1204*a-c* within the resource selection window 1207, and may perform sensing on the Y slots. Then remote UE may determine, the candidate resource set 1206*a-c* within the selection window 1213 based on the results of sensing in each of slots 1204*a-c*. In order to reduce SCI and/or PSSSH decoding, the partial sensing slots may be pre-configured by the BS and signaled to remote UE.

In some example, the BS may determine a subset of time and frequency resources within the Y slots 1204*a-c*, and may configure the remote UE with the SCI monitoring search region. Hence, the remote UE may perform partial sensing in the subset of the time and frequency resources configured by the BS. In some example, the subset of time and frequency resources are transmitted to the remote UE via PSBCH semi-statically. In some other example, the subset of time and frequency resources are transmitted to the remote UE via SCI in PSCCH dynamically. In yet another example, the subset of time and frequency resources are transmitted to the remote UE via a separate channel dedicated for the transmission of the subset of time and frequency resources.

Figure 13:
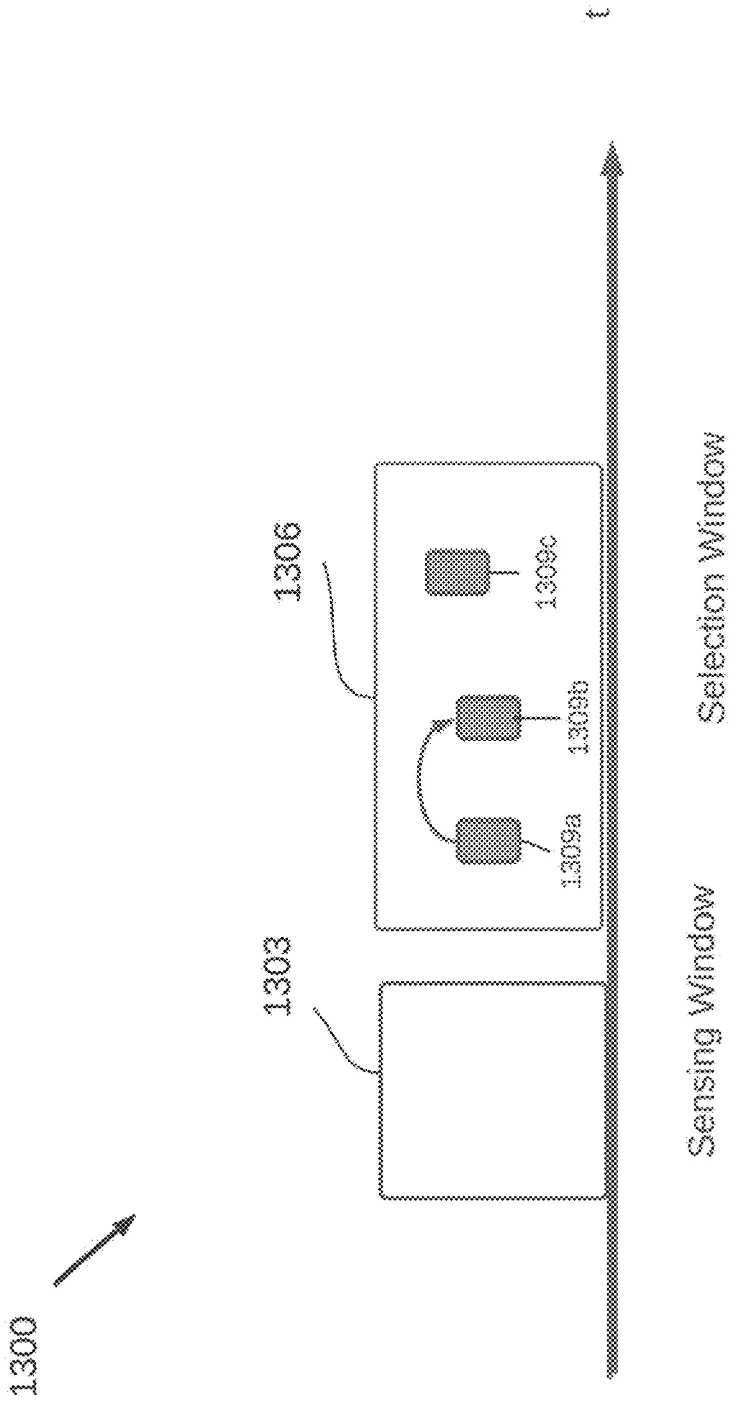
FIG. 13 shows example of SL resource allocation process with pre-emption for periodic traffic according to some aspects of some of various exemplary embodiments of the present disclosure.

FIG. 13 shows example of sidelink resource pool selection and pre-emption for a periodic traffic according to some aspects of the present disclosure. The scheme 1300 may be employed by UEs 125A-B in a network such as networks 100 for sidelink communications. In particular, sidelink UEs may employ the scheme 1300 for SCI monitoring and sidelink data communication over the sidelink forward/backward links. In some aspects, the scheme 1300 can be employed in conjunction with the scheme 1000 of FIG. 10. In FIG. 1300, the x-axis represents time in some arbitrary units, and the y-axis represents frequency in some arbitrary units. The sidelink resource pool 1300 may be over a licensed band or a shared radio frequency band (e.g., in an unlicensed band). The resource pool 1300 may have the same frame structure 700 shown in FIG. 7. For instance, the resource pool 1300 may include a set of sidelink resource pool 1303, 1306 arranged in a number of slots across time and a number of subbands in frequency similar to the resource 700 shown in FIG. 7. Each sidelink resource 1300 may include a sensing windows 1303, and a selection window 1306. In some example, the BS (e.g. 1003) may configure the relay UE (e.g., 1005) with the sidelink resource pool. In some example, the relay UE (e.g., 1005) may determine the sidelink resource pool 1300 based on a configuration received from the BS (e.g., BS 1003). In some aspect, the resource pool 1300 may be used for transmission from the relay UE to the remote UE over the forwardlink 1009. In some aspects, the resource pool 1300 may be used for transmission from the remote UE to the relay UE over the backward link.

The remote UE may perform partial sensing in sensing window 1303 as described in FIG. 11-12 to reserve the candidate resources 1209*a-c* in the selection windows 1306 for a periodic traffic periodically. In a periodic traffic since the remote UE is aware of arriving time the data packet, it may perform pre-emption for the reserved resources 1309*a-c*. The remote UE may perform pre-emption check to determine whether there is resource collision, and determine whether resource selection should be triggered.

Figure 14:
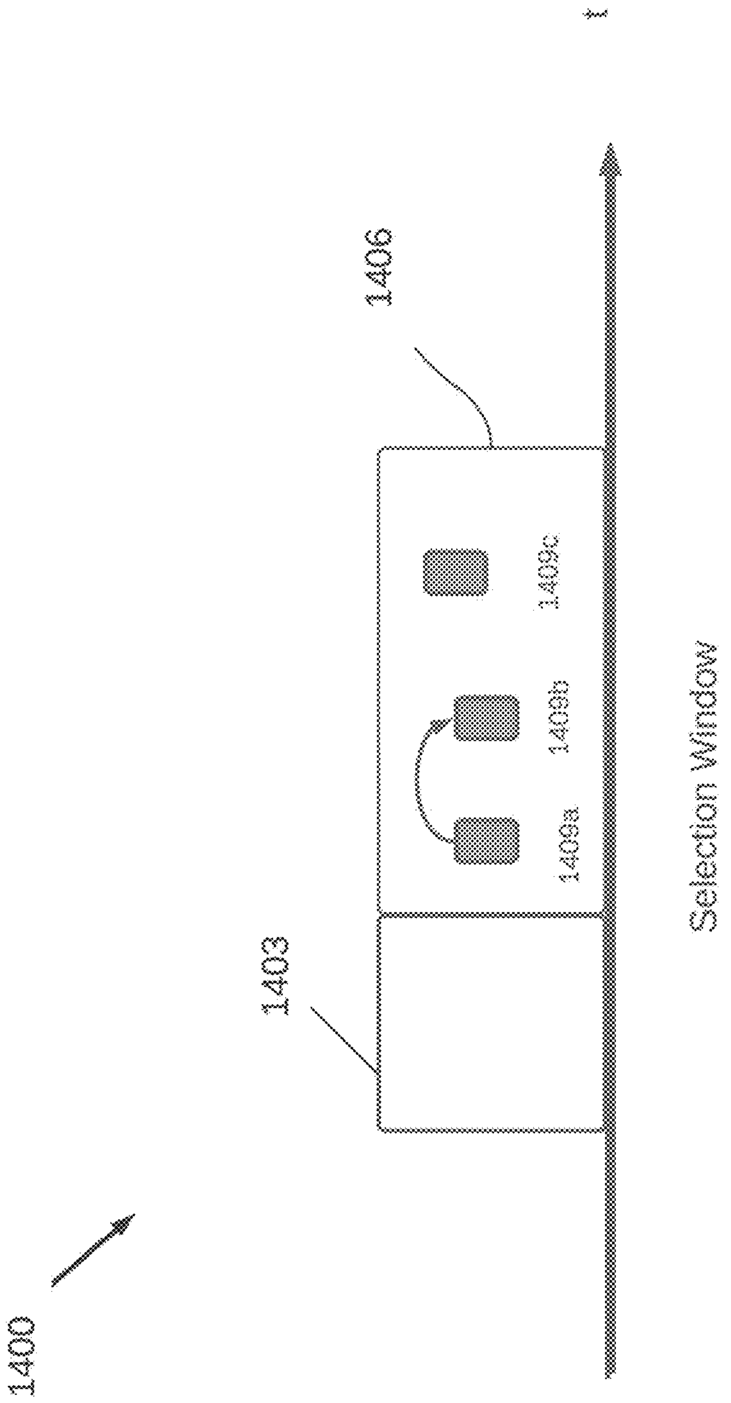
FIG. 14 shows example of SL resource allocation process with pre-emption for aperiodic traffic according to some aspects of some of various exemplary embodiments of the present disclosure.

FIG. 14 shows example of sidelink resource pool selection and pre-emption for aperiodic traffic according to some aspects of the present disclosure. The scheme 1400 may be employed by UEs 125A-B in a network such as networks 100 for sidelink communications. In particular, sidelink UEs may employ the scheme 1400 for SCI monitoring and sidelink data communication over the sidelink forward/backward links. In some aspects, the scheme 1400 can be employed in conjunction with the scheme 1000 of FIG. 10. In FIG. 1400, the x-axis represents time in some arbitrary units, and the y-axis represents frequency in some arbitrary units. The sidelink resource pool 1400 may be over a licensed band or a shared radio frequency band (e.g., in an unlicensed band). The resource pool 1400 may have the same frame structure 700 shown in FIG. 7. For instance, the resource pool 1400 may include a set of sidelink resource pool 1403, 1406 arranged in a number of slots across time and a number of subbands in frequency similar to the resource 700 shown in FIG. 7. Each sidelink resource 1400 may include a selection window 1406. In some example, the BS (e.g. 1003) may configure the relay UE (e.g., 1005) with the sidelink resource pool. In some example, the relay UE (e.g., 1005) may determine the sidelink resource pool 1400 based on a configuration received from the BS (e.g., BS 1003). In some aspect, the resource pool 1400 may be used for transmission from the relay UE to the remote UE over the forwardlink 1009. In some aspects, the resource pool 1300 may be used for transmission from the remote UE to the relay UE over the backward link.

The remote UE may perform partial sensing in window 1403 within the selection window 1406 as described in FIG. 11-12, to reserve the candidate resources 1409*a-c* in the selection windows 1306 for aperiodic traffic. In aperiodic, since the arriving time of the data packet is not known, the remote UE may perform partial sensing within the selection window 1406. Once the data packet arrives, the remote UE may perform pre-emption for the reserved resources 1309*a-c*. The remote UE may perform pre-emption check to determine whether there is resource collision, and determine whether resource selection should be triggered.

Figure 15:
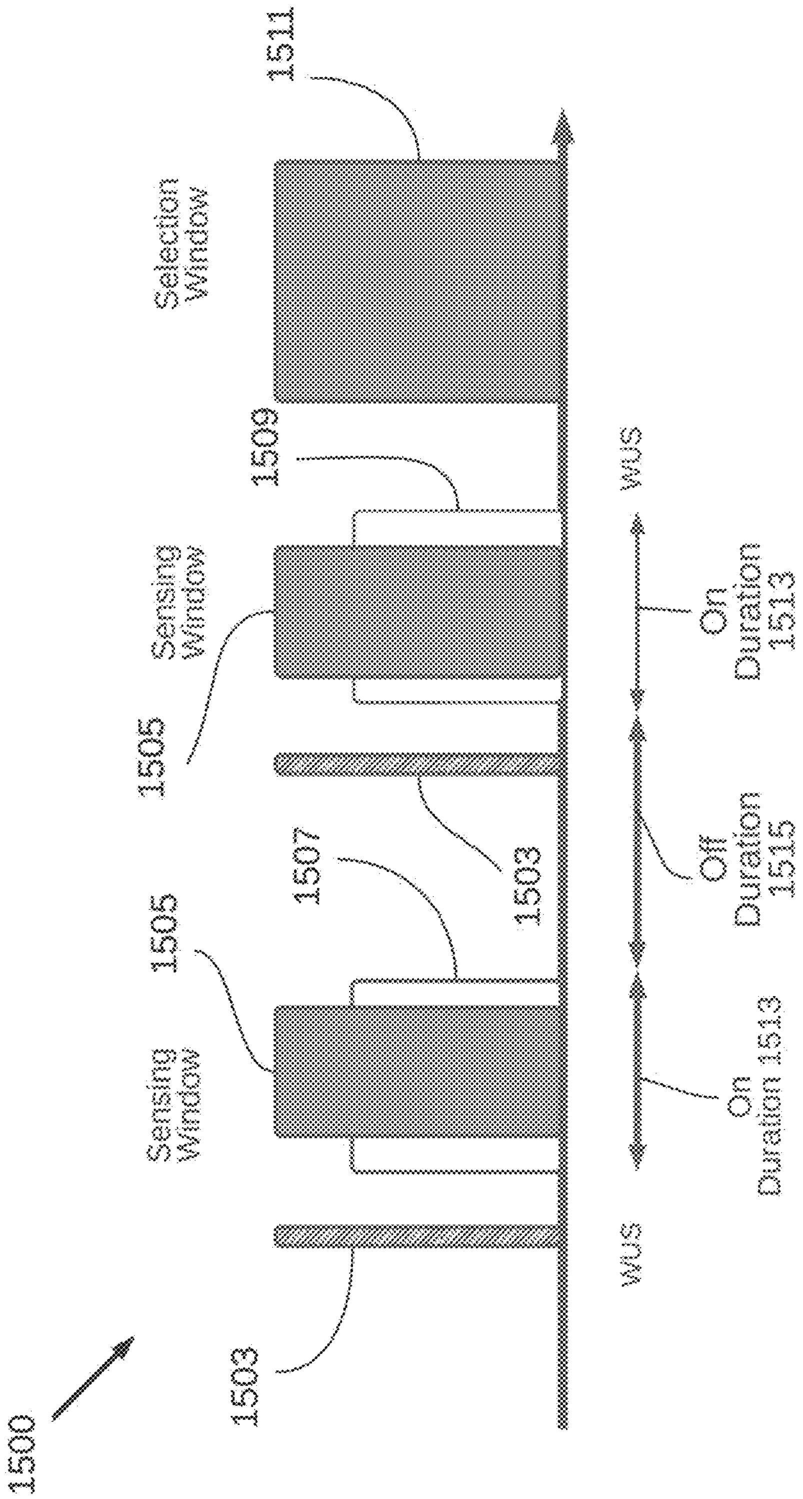
FIG. 15 shows example of SL resource allocation process for UE configured with Discontinuous Reception (DRX) according to some aspects of some of various exemplary embodiments of the present disclosure.

FIG. 15 shows example of sidelink resource pool selection and pre-emption for Discontinuous Reception (DRX) mode according to some aspects of the present disclosure. The scheme 1500 may be employed by UEs 125A-B in a network such as networks 100 for sidelink communications. In particular, sidelink UEs may employ the scheme 1500 for SCI monitoring and sidelink data communication over the sidelink forward/backward links. In some aspects, the scheme 1500 can be employed in conjunction with the scheme 1000 of FIG. 10. In FIG. 1500, the x-axis represents time in some arbitrary units, and the y-axis represents frequency in some arbitrary units. The sidelink resource pool 1500 may be over a licensed band or a shared radio frequency band (e.g., in an unlicensed band). The resource pool 1500 may have the same frame structure 700 shown in FIG. 7. For instance, the resource pool 1500 may include a set of sidelink resource pool 1505, 1511 arranged in a number of slots across time similar to the resource 700 shown in FIG. 7. Each sidelink resource 1500 may include sensing windows 1505, and selection windows 1511. In some example, the BS (e.g., 1003) may configure the relay UE (e.g., 1005) with the sidelink resource pool. In some example, the relay UE (e.g., 1005) may determine the sidelink resource pool 1500 based on a configuration received from the BS (e.g., BS 1003). In some aspect, the resource pool 1500 may be used for transmission from the relay UE to the remote UE over the forward link 1009. In some aspects, the resource pool 1500 may be used for transmission from the remote UE to the relay UE over the backward link.

In the resource pool 1500, the remote UE may be configured in DRX mode. In DRX mode, the remote UE may be monitor PSCCH and PSSCH during on duration (1513). The remote UE may power down during the off duration 1513 to save power consumption. The remote UE may be configured with Wake-Up Signal 1503. The WUS signal 1503 may be used to indicate to the remote UE to wake up to perform sensing in the sensing window 1507. If the remote UE is configured with WUS, the remote UE may not perform sensing during the off duration 1515. Once the remote UE receives the WUS signal 1503, it may perform the partial sensing 1505 within the sensing window 1507 on a reduced subset of slots and frequency channels in the selection window 1511. The remote UE may use a mechanism to maximize the overlap between DRX on duration 1513 and sensing occasions 1507. This may be pre-configured by the BS and transmitted to the remote UE.

Figure 16:
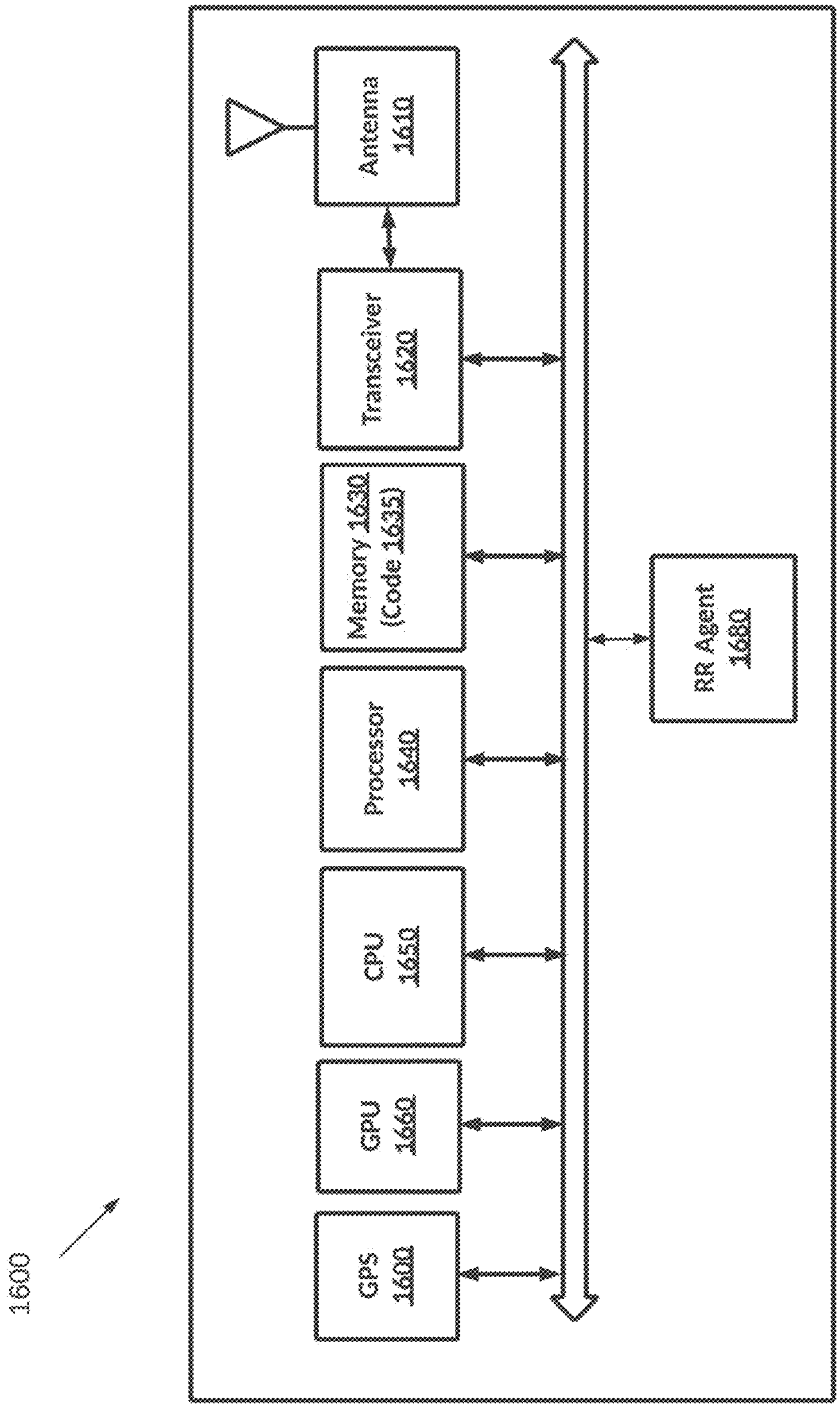
FIG. 16 shows example components of a user equipment for transmission and/or reception according to some aspects of some of various exemplary embodiments of the present disclosure.

FIG. 16 shows example components of a UE (e.g., UE 1005, 1003) for transmission and/or reception according to some aspects of some of various exemplary embodiments of the present disclosure. All or a subset of blocks and functions in FIG. 16 may be in the UE 1600 and may be performed by the user equipment 1600. The Antenna 1610 may be used for transmission or reception of electromagnetic signals. The Antenna 1610 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1610 may enable a massive MIMO configuration with tens or hundreds of antenna elements. The Antenna 1610 may enable other multi-antenna techniques such as beamforming. In some examples and depending on the UE 1600 capabilities, the UE 1600 may support a single antenna only.

The transceiver 1620 may communicate bi-directionally, via the Antenna 1610, wireless links as described herein. For example, the transceiver 1620 may represent a wireless transceiver at the UE 1600 and may communicate bi-directionally with the wireless transceiver at the base station or vice versa. The transceiver 1620 may include a modem to modulate the packets and provide the modulated packets to the Antennas 1610 for transmission, and to demodulate packets received from the Antennas 1610.

The memory 1630 may include RAM and ROM. The memory 1630 may store computer-readable, computer-executable code 1635 including instructions that, when executed, cause the processor to perform various functions described herein. In some examples, the memory 1630 may contain, among other things, a Basic Input/output System (BIOS) which may control basic hardware or software operation such as the interaction with peripheral components or devices.

The processor 1640 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory using a memory controller. In other examples, a memory controller may be integrated into the processor 1640. The processor 1640 may be configured to execute computer-readable instructions stored in a memory (e.g., the memory 1730) to cause the UE 1600 to perform various functions.

The Central Processing Unit (CPU) 1650 may perform basic arithmetic, logic, controlling, and Input/output (I/O) operations specified by the computer instructions in the Memory 1630. The user equipment 1600 and may include additional peripheral components such as a graphics processing unit (GPU) 1660 and a Global Positioning System (GPS) 1670. The GPU 1660 is a specialized circuitry for rapid manipulation and altering of the Memory 1630 for accelerating the processing performance of the user equipment 1600 and/or the base station 1605. The GPS 1670 may be used for enabling location-based services or other services for example based on geographical position of the user equipment 1600.

The resource allocation agent 1680, may perform resource pool allocation, monitoring for SCI, and data communication management over forward/backward links as described in FIGS. 10-16.

Figure 17:
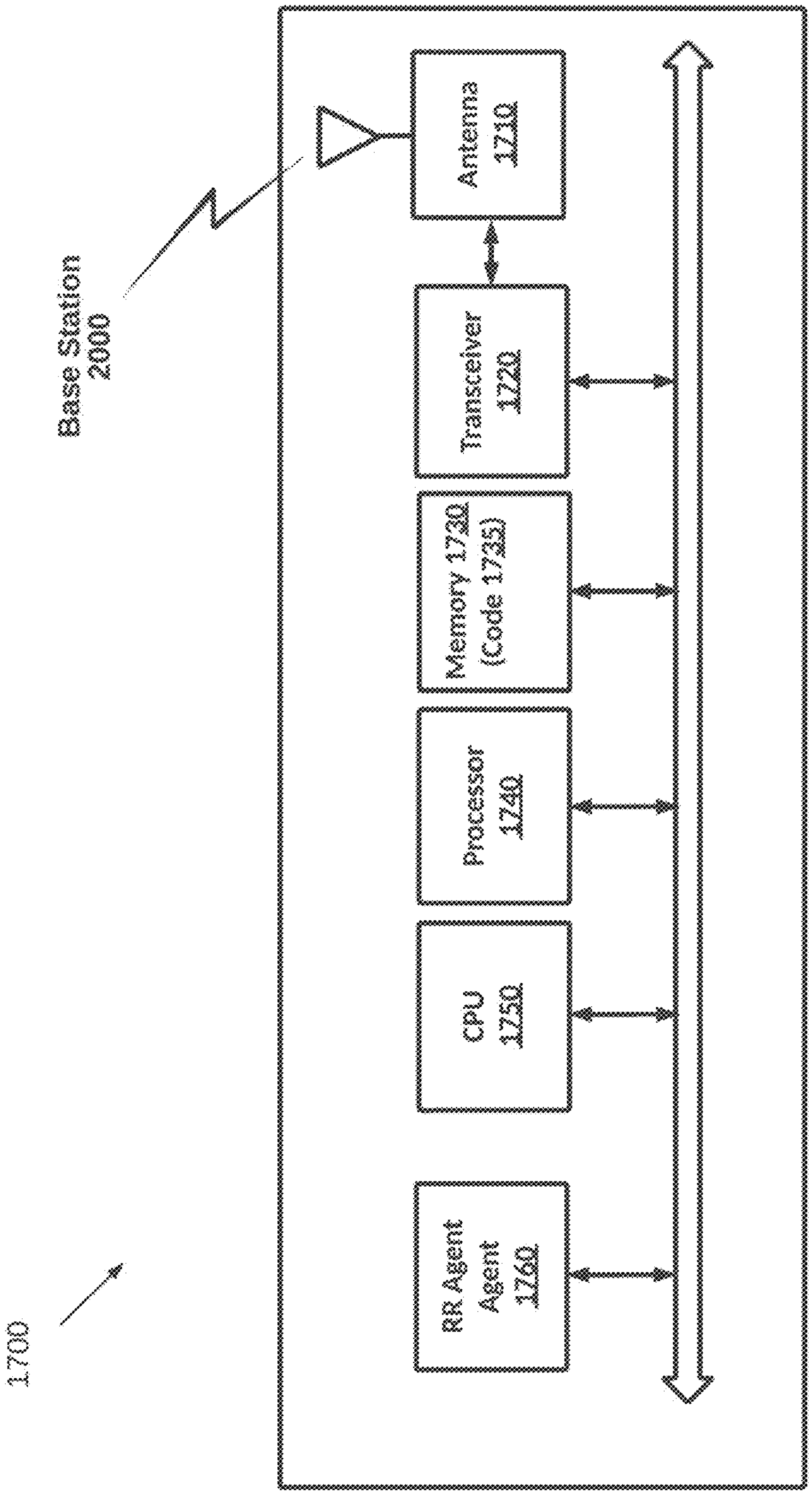
FIG. 17 shows example components of a base station for transmission and/or reception according to some aspects of some of various exemplary embodiments of the present disclosure.

FIG. 17 shows example components of a BS (e.g., BS 1003) for transmission and/or reception according to some aspects of some of various exemplary embodiments of the present disclosure. All or a subset of blocks and functions in FIG. 17 may be in the BS 1700 and may be performed by the user equipment 1700. The Antenna 1710 may be used for transmission or reception of electromagnetic signals. The Antenna 1710 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1710 may enable a massive MIMO configuration with tens or hundreds of antenna elements. The Antenna 1710 may enable other multi-antenna techniques such as beamforming. In some examples and depending on the BS 1700 capabilities, the UE 1700 may support a single antenna only.

The transceiver 1720 may communicate bi-directionally, via the Antenna 1710, wireless links as described herein. For example, the transceiver 1620 may represent a wireless transceiver at the UE and may communicate bi-directionally with the wireless transceiver at the base station or vice versa. The transceiver 1720 may include a modem to modulate the packets and provide the modulated packets to the Antennas 1710 for transmission, and to demodulate packets received from the Antennas 1710.

The memory 1730 may include RAM and ROM. The memory 1630 may store computer-readable, computer-executable code 1735 including instructions that, when executed, cause the processor to perform various functions described herein. In some examples, the memory 1630 may contain, among other things, a Basic Input/output System (BIOS) which may control basic hardware or software operation such as the interaction with peripheral components or devices.

The processor 1740 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1740 may be configured to operate a memory using a memory controller. In other examples, a memory controller may be integrated into the processor 1740. The processor 1740 may be configured to execute computer-readable instructions stored in a memory (e.g., the memory 1630) to cause the BS 1700 to perform various functions.

The Central Processing Unit (CPU) 1750 may perform basic arithmetic, logic, controlling, and Input/output (I/O) operations specified by the computer instructions in the Memory 1730.

The resource allocation agent 1780, may perform resource pool allocation, configure resource parameters for resource allocation, and manage data communication for the remote UE links as described in FIGS. 10-16

Figure 18:
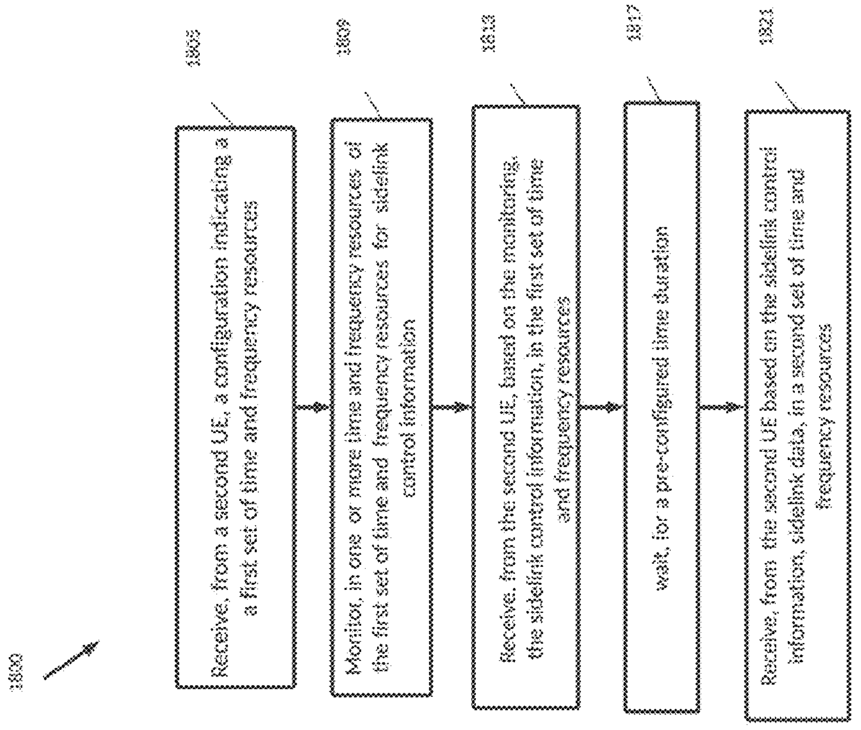
FIG. 18 shows a flow diagram illustrating a resource allocation method performed by a remote UE according to some aspects of some of various exemplary embodiments of the present disclosure.

FIG. 18 is a flow diagram of a method 1800 for a remote UE performing resource allocation according to some aspects of the present disclosure. The method 1800 is implemented by a UE (e.g., UE 1003). The steps of method 1800 can be executed by computing devices (e.g., a processor, processing circuit, and/or other components) of the UE. As illustrated, the method 1800 may include additional steps before, after, and in between the enumerated steps.

At step 1805, the remote UE receives, from a relay UE, a configuration indicating a set of time and frequency resource regions. The set of time and frequency resources may include resources for sensing, transmission of SCI and/or data communication over the forward/backward links. The remote UE may perform sensing in the set of time and frequency resource region to select resources for the data communication over forward/backward link.

At step 1809, the remote UE monitors, in one or more time and frequency resource of the set of time and frequency resource regions for sidelink control information (SCI).

At step 1813, the remote UE receives, from the relay UE, based on the monitoring, the SCI in the set of time and frequency resource region indicated by the relay UE. In some aspects, the UE may decode SCI in the all the set of time and frequency regions indicated by the relay UE. The SCI may include information required for decoding the data. In some examples, if the remote UE is configured with DRX, the remote UE may use WUS signal to wake up, and perform sensing to select resources for data communications over forward/backward links.

At step 1817, the remote UE waits for a pre-configured duration of time till the data packet arrives. In some examples, the remote UE may receive periodic data traffic. In some examples, the remote UE may receive aperiodic data traffic. The UE remote UE may perform pre-emption to determine whether there is any collision in the selected resources, and the resource should be triggered.

At step 1821, the remote UE receives, from the relay UE based on the SCI, sidelink data, in the selected resources.

Figure 19:
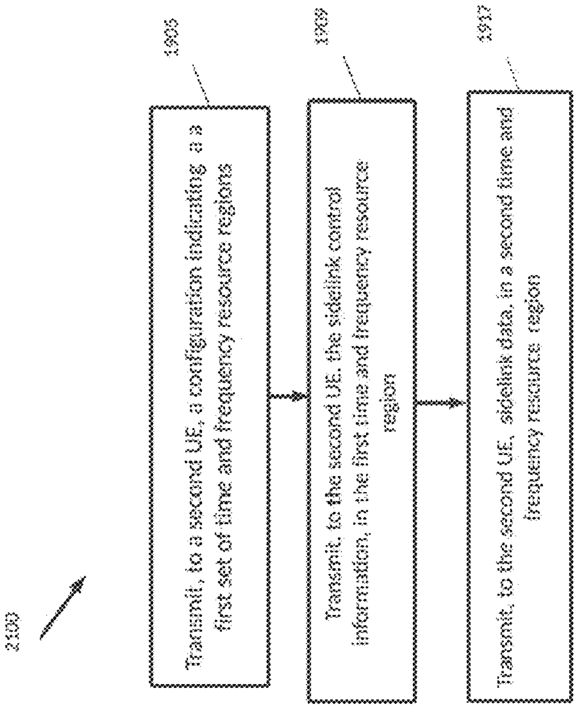
FIG. 19 shows a flow diagram illustrating a resource allocation method performed by a relay UE according to some aspects of some of various exemplary embodiments of the present disclosure.

FIG. 19 is a flow diagram of a method 1900 for a relay UE performing resource allocation according to some aspects of the present disclosure. The method 1900 is implemented by a BS (e.g., UE 1005). The steps of method 1900 can be executed by computing devices (e.g., a processor, processing circuit, and/or other components) of the UE. As illustrated, the method 1900 may include additional steps before, after, and in between the enumerated steps.

At step 1905, the relay UE transmits to a relay UE, a configuration indicating a set of time and frequency resource regions. The set of time and frequency resources may include resources for sensing, transmission of SCI and/or data communication over the forward/backward links. In some example, the set of time and frequency resource region may be pre-configured by a BS (e.g., BS 1003), and the relay UE may transmit it to the remote UE.

At step 1909, the relay UE transmits to the remote UE the SCI in the set of time and frequency resource region. In some aspects, the remote UE may perform sensing in the set of time and frequency resources to select the resources for data communication over forward/backward link. The SCI may include information required for decoding the data.

At step 1917, the relay UE transmits sidelink data to the remote UE in the selected time and frequency resource region.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

What is claimed is:

1. A method of data transmission performed by a first user equipment (UE), comprising the steps of:

receiving, by the first UE, one or more configuration parameters indicating a first set of time and frequency resources associated with partial sensing in sidelink communications;

monitoring for sidelink control information (SCI) based on the partial sensing and in one or more resources determined based on the one or more configuration parameters;

receiving, based on the monitoring, the SCI from a second UE; and receiving, based on the SCI, sidelink data from the second UE.

2. The method of claim 1, wherein the first set of time and frequency resources includes one or more time slots in a same frequency subband.

3. The method of claim 1, wherein the first set of time and frequency resources includes one or more time slots in one or more frequency subbands.

4. The method of claim 1, wherein the one or more configuration parameters are transmitted via a dedicated channel defined for the transmission of the first set of time and frequency resources.

5. The method of claim 1, wherein the one or more configuration parameters are transmitted semi-statically via a Physical Sidelink Broadcast Channel (PSBCH).

6. The method of claim 1, wherein:

receiving the sidelink data is based on a second set of time and frequency resources; and the second set of time and frequency resources is selected based on sensing the first set of time and frequency resources such that no collision occurs in the second set of time and frequency resources.

7. The method of claim 6, further comprising:

performing a pre-emption check before receiving traffic in the second set of time and frequency resources to determine if any other traffic collides with the resources in said second set.

8. The method of claim 1, wherein the sidelink data is a periodic traffic.

9. The method of claim 1, wherein the sidelink data is an aperiodic traffic.

10. The method of claim 1, wherein a base station (BS) configures the resources in the first set of time and frequency resources.

11. The method of claim 1, wherein:

the first user equipment (UE) is configured with discontinuous reception (DRX).

12. The method of claim 11, wherein the first set of time and frequency resources are within the DRX on duration.

13. The method of claim 1, wherein:

the first user equipment (UE) is configured with a wake up signal (WUS), wherein the WUS signal notifies to the first UE to wake up and monitor for sidelink control information (SCI) in the first set of time and frequency resources.

14. A user equipment (UE) comprising:

one or more processors; and memory storing instructions, that when executed by the one or more processors, cause the UE to:

receive one or more configuration parameters indicating a first set of time and frequency resources associated with partial sensing in sidelink communications;

monitor for sidelink control information (SCI) based on the partial sensing and in one or more resources determined based on the one or more configuration parameters;

receive, based on the monitoring, the SCI from a second UE;

receive, based on the SCI, sidelink data from the second UE.

15. The user equipment (UE) of claim 14, wherein the first set of time and frequency resources includes one or more time slots in a same frequency subband.

16. The user equipment (UE) of claim 14, wherein the first set of time and frequency resources includes one or more time slots in one or more frequency subbands.

17. The user equipment (UE) of claim 14, wherein the one or more configuration parameters are transmitted via a dedicated channel defined for the transmission of the first set of time and frequency resources.

18. The user equipment (UE) of claim 14, wherein the one or more configuration parameters are transmitted semi-statically via a Physical Sidelink Broadcast Channel (PSBCH).

19. The user equipment (UE) of claim 14, wherein:
receiving the sidelink data is based on a second set of time and frequency resources; and
the second set of time and frequency resources is selected based on sensing the first set of time and frequency resources such that no collision occurs in the second set of time and frequency resources.

20. A method of data transmission, performed by a base station, comprising the steps of:
transmitting, by the base station to a first user equipment (UE), one or more configuration parameters indicating a first set of time and frequency resources associated with partial sensing in sidelink communications; and
wherein:
sidelink control information (SCI) is monitored based on the partial sensing and in one or more resources determined based on the one or more configuration parameters;
the SCI is received from a second UE based on the monitoring; and
sidelink data is received from the second UE based on the SCI.

* * * * *